United States Patent [19]
Huber

[11] 3,898,078
[45] Aug. 5, 1975

[54] METHOD AND APPARATUS FOR INJECTING REFINING OXYGEN IN STEELMAKING PROCESSES

[75] Inventor: Richard A. Huber, Village of Washingtonville, Ohio

[73] Assignee: Youngstown Sheet and Tube Company, Youngstown, Ohio

[22] Filed: Mar. 29, 1973

[21] Appl. No.: 346,053

[52] U.S. Cl. .......................... 75/60; 75/59; 266/41
[51] Int. Cl.².... C21C 5/34; C21B 7/16; C21C 5/48
[58] Field of Search ............. 75/60, 59; 266/33, 23, 266/41

[56] References Cited
UNITED STATES PATENTS

| | | | |
|---|---|---|---|
| 2,593,505 | 4/1952 | Wagstaff | 75/60 |
| 2,826,494 | 3/1958 | Drummond | 75/59 |
| 2,936,230 | 5/1960 | Larsen | 75/60 |
| 3,078,084 | 2/1963 | Foresi | 266/33 |
| 3,201,226 | 8/1965 | Spolders | 75/59 |
| 3,330,645 | 7/1967 | DeMoustier | 75/60 |
| 3,706,549 | 12/1972 | Knuppel | 75/60 |
| 3,725,041 | 4/1973 | Ramachandran | 75/60 |
| 3,802,685 | 4/1974 | Brisse | 75/60 |

*Primary Examiner*—Peter D. Rosenberg
*Attorney, Agent, or Firm*—John Stelmah

[57] ABSTRACT

Method and apparatus for refining a molten bath of a steelmaking composition which includes the injection of an oxygen stream introduced beneath the surface of the bath through a nozzle. The oxygen stream is shrouded by hydrocarbon fluid which serves as a coolant for protecting the discharge end of the nozzle, and the oxygen stream is expanded adiabatically just prior to discharge into the molten bath.

6 Claims, 3 Drawing Figures

METHOD AND APPARATUS FOR INJECTING REFINING OXYGEN IN STEELMAKING PROCESSES

BACKGROUND OF THE INVENTION

This invention relates to a method and apparatus of producing steel which comprises refining a molten steelmaking composition with highly concentrated oxygen. The invention further relates to the method and apparatus for the refining of a molten steelmaking composition by injecting a concentration of oxygen beneath the surface of the melt. The invention still further relates to a method and means for protecting an oxygen injector in a steel refining process.

It is known in the art of steelmaking to charge a converter vessel with molten crude iron and steel scrap and direct downwardly to the charge at high velocity from a burner-type lance oxygen and a liquid hydrocarbon fuel. It is also known in electric furnace steelmaking to combine heavy oil with oxygen for making a reducing furnace atmosphere. A variety of devices have also been proposed in relation to mixing proportions, feed pressures, and atomizing means for increasing combustion efficiencies. In contrast, the use of carbonaceous liquid in the process according to this invention is to provide a coolant for an oxygen injector nozzle which injects oxygen within a molten bath below the surface thereof.

OBJECTS AND SUMMARY OF THE INVENTION

It is an object of this invention to provide an improved method and apparatus for oxygen refining of steelmaking compositions.

It is another object of this invention to provide a method and apparatus for deterring consumption of submerged oxygen injector nozzle means.

It is a further object of this invention to provide a method and apparatus for cooling an oxygen injector nozzle in a molten steel bath.

The process of this invention utilizes an oxygen injector nozzle which is cooled through the expeditious use of carbonaceous liquid. The liquid is introduced with the oxygen into a molten steelmaking composition in a manner whereby the liquid is atomized and provides a shroud for the oxygen nozzle discharge end. Preferably, the oxygen is also adiabatically expanded upon discharge to provide an additional cooling effect.

DESCRIPTION OF THE DRAWING

The invention will be further understood and other details and advantages thereof will become apparent when reference is made to the following detailed description of certain presently preferred embodiments, and the accompanying drawing, in which.

DESCRIPTION OF PREFERRED EMBODIMENT

Figure 1:
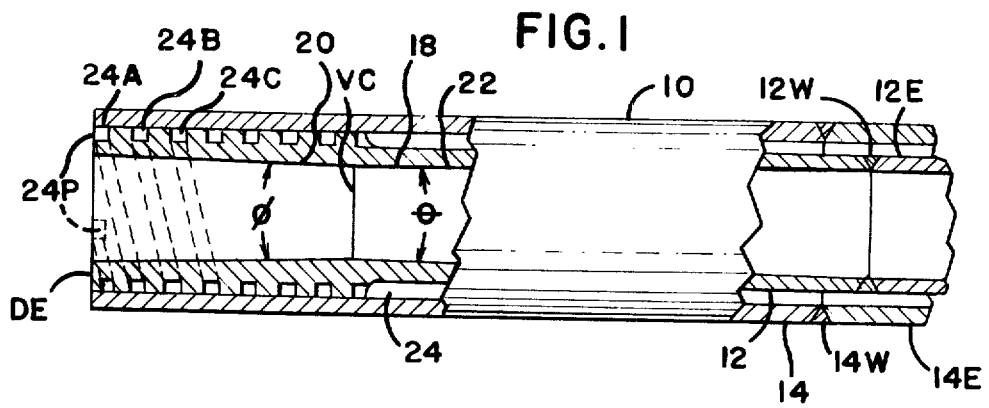
FIG. 1 is a cross-sectional view of a preferred form of an oxygen injector nozzle.

In a representative embodiment as illustrated in FIG. 1, the oxygen injector nozzle 10 comprises an inner conduit 12 and a circumposing outer conduit 14. The conduit 12 defines a passage 16. Preferably the passage 16 has a converging section 18 and a diverging section 20, which sections together define a venturi tube 22.

It is believed that maximum cooling effect due to adiabatic expansion of the oxygen prior to discharge will occur if the included angle $\phi$ of section 20 is in the order of 8° and if the included angle $\theta$ of section 18 is in the order of 4°. Hence, in an exemplary embodiment, wherein the inside diameter of the oxygen line is 2 inches, at both the entry and discharge ends of the venturi tube 22, the diameter at the vena contracta VC is 1½ inches, the length of the converging section 18 will be in the order of 7.150 inches and the length of the diverging section will be in the order of 3.575 inches.

The conduit 12 is preferably made of oxygen erosion resistance material such as copper or No. 304 type stainless steel. The conduit 14, which is not directly exposed to the oxygen may be of plain low carbon steel.

The inner conduit 12 and outer conduit 14 are coaxial and define therebetween a main passage 24 for directing a fluid coolant, preferably a liquid carbonaceous fuel, e.g., oil, to the discharge end DE of conduit 12. A portion of conduit 12, toward the discharge end, is of increased cross-section. The increased section defines a series of helical exit passages which terminate in discharge ports 24 P equally spaced apart about the circumference of conduit 12. In a preferred embodiment there are three helical passages 24 A, 24 B, and 24 C, all of which form extensions of passage 24 and terminate in discharge ports 120 degrees apart. The helical passages at the discharge end face DE impart a swirling action to the coolant as it is discharged to enhance atomization of the oil. Preferably, each of the helical passages 24 A, 24 B and 24 C is a triple lead helix formed by machining a groove in the increased body section of conduit 12. The increased body section also serves as spacing means for maintaining conduits 12 and 14 in the desired spaced relation. The number of helices is optimized to provide uniform distribution of coolant about the nozzle discharge end.

The dimensions and parameters of the conduits 12 and 14 will be dictated by the desired oxygen and fuel flow rates; however, in each case it is preferred, in order to optimize adiabatic expansion of the oxygen to maintain the included angle $\phi$ in the order of 8° and the included angle $\theta$ in the order of 4°.

It will be noted that the interior of nozzle 10 is cooled by the adiabatic expansion of the oxygen as it passes from the vena contracta. The end face at discharge end DE is additionally cooled by the endothermic "cracking" of the oil or other hydrocarbon fuels.

Figure 2:
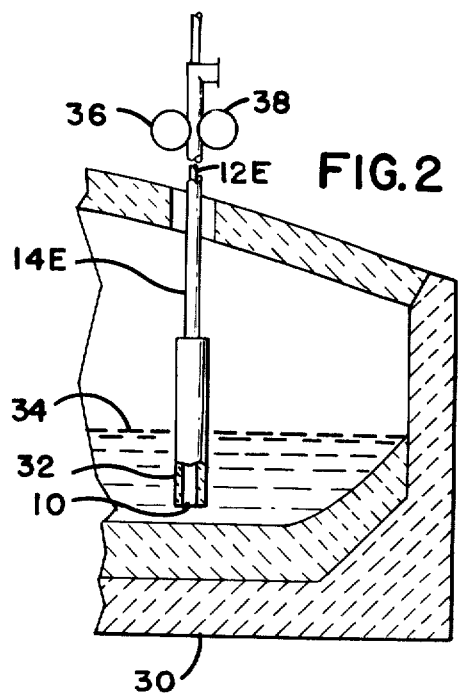
FIG. 2 is a diagrammatic view of a fragmentary portion of a steelmaking refining vessel together with an injector nozzle of this invention being supported by a structure extending through the roof of said vessel.
Figure 3:
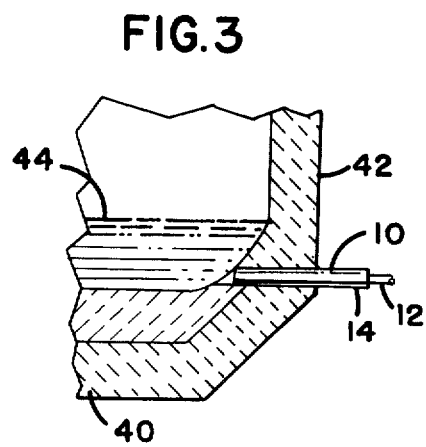
FIG. 3 is a view similar to FIG. 2, but with the injector nozzle extending through a sidewall of the refining vessel.

In FIG. 3 there is diagrammatically shown an open hearth type of refining vessel 30 showing the manner in which the nozzle 10 may be suspended in a vertical direction. As shown in FIG. 1, conduit 12 may be suitably secured to an extension 12 E, as by weld 12 W, which extension leads to a suitable source of oxygen, not shown. In a like manner the conduit 14 may be joined by weld 14 W to extension 14 E, which in turn leads to a suitable source of coolant, e.g., hydrocarbon fuel. The lower portion of nozzle (FIG. 2) is covered with suitable refractory type material 32 to protect the main body of the nozzle 10 from the erosive action of the melt 34. There is also schematically shown elevating means, in the form of pulleys 36 and 38, one or both of which may be power-driven, for raising and lowering the nozzle 10. One of the advantages of suspending the nozzle 10 and providing elevating means is elimination of a need for circulating an inert fluid during a non-refining period in order to keep the nozzle parts open, i.e., the nozzle 10 is elevated out of the melt and hence the molten metal will not freeze in and "plug up" the ports.

In FIG. 3 is schematically illustrated a refining vessel 40 in which the nozzle 10 of this invention is supported, in a horizontal position, preferably in the backwall 42. In such an arrangement only the discharge end face DE is exposed to the melt 44.

It will be seen that this invention provides a method and apparatus for producing steel by refining a molten bath of steelmaking composition by injecting a stream of highly concentrated essentially pure oxygen beneath the surface of the bath, which stream is preferably adiabatically expanded and is shrouded by an atomized and endothermic cracked hydrocarbon fluid in order to extend the life of the oxygen injector.

What is claimed is:

1. In a method of refining a molten bath of a steelmaking composition, wherein:

a stream of concentrated oxygen is introduced through an injector nozzle having its discharge terminus beneath the surface of the bath, and said stream of oxygen is shrouded by hydrocarbon fluid, the improvement which comprises:

adiabatically expanding said stream of oxygen just prior to discharge into said bath.

2. The method as described in claim 1, which further comprises:

delivering said hydrocarbon fluid in a plurality of streams through a plurality of exit passages having their exits terminating in discharge ports equally spaced about said discharge terminus to facilitate atomization of said fluid.

3. The method of claim 1, wherein:

said oxygen and said hydrocarbon fluid are introduced through nozzle means suspended from above said molten bath.

4. The method as described in claim 2, wherein:

said plurality of exit passages is in the form of helices.

5. The method as described in claim 4, wherein:

said nozzle defines a venturi tube delivering said oxygen and said helices generally extend from a section corresponding to the vena contracta of the venturi tube.

6. The method as described in claim 4, wherein:

said helices are generally at 15°.

* * * * *